United States Patent
Raghu et al.

(10) Patent No.: US 10,291,520 B2
(45) Date of Patent: May 14, 2019

(54) REDUNDANT TRAFFIC SUPPRESSION RELAYING MECHANISM FOR BLE-MESH SYSTEMS

(71) Applicant: Texas Instruments Incorporated, Dallas, TX (US)

(72) Inventors: Arvind Kandhalu Raghu, Plano, TX (US); Kaichien Tsai, Allen, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/495,441

(22) Filed: Apr. 24, 2017

(65) Prior Publication Data
US 2017/0325127 A1 Nov. 9, 2017

(51) Int. Cl.
| H04L 12/721 | (2013.01) |
| H04L 12/801 | (2013.01) |
| H04W 28/14 | (2009.01) |
| H04W 40/02 | (2009.01) |
| H04W 8/00 | (2009.01) |

(Continued)

(52) U.S. Cl.
CPC .............. *H04L 45/72* (2013.01); *H04B 7/15* (2013.01); *H04L 47/34* (2013.01); *H04W 8/005* (2013.01); *H04W 28/14* (2013.01); *H04W 40/023* (2013.01); *H04W 74/0808* (2013.01);

(Continued)

(58) Field of Classification Search
CPC ........... H04W 88/04; H04B 7/15; H04B 7/14; H04B 7/15592; H04B 7/155
See application file for complete search history.

(56) References Cited

U.S. PATENT DOCUMENTS

| 2008/0198835 A1* | 8/2008 | Miyanaga | H04B 7/022 370/350 |
| 2015/0366035 A1* | 12/2015 | Baek | H05B 37/0272 315/131 |

(Continued)

OTHER PUBLICATIONS

H. Jiao, F. Li, A Contention-based Multiple Access Protocol in Cooperative Wireless Networks, Proceedings of the IWCMC 2010, Jun. 28-Jul. 2, 2010, pp. 246-250.*

(Continued)

*Primary Examiner* — Christopher M Crutchfield
(74) *Attorney, Agent, or Firm* — Ronald O. Neerings; Charles A. Brill; Frank D. Cimino

(57) ABSTRACT

A BLE-Mesh device includes a controller, an RF driver for driving the transceiver adapted to be coupled to an antenna, and a counter. The controller implements an applications layer including BLE and Mesh Applications, and a BLE stack and a mesh stack. A redundant traffic suppression relaying algorithm is for waiting for a random time within a selected time window from W1 to a later W2 before attempting to transmit a first packet that contains a unique source (SRC) address and a packet sequence (SEQ) number of a device that is the source of the first packet. If during the random time a packet with both the source device's SRC address and the SEQ number is received, the counter is incremented from an initial count to a current count. After the random time elapses, the current count is compared to a Cthreshold value, and the first packet is transmitted only if the current count<the Cthreshold value.

21 Claims, 4 Drawing Sheets

(51) Int. Cl.
    *H04W 88/04*     (2009.01)
    *H04W 74/08*     (2009.01)
    *H04W 84/18*     (2009.01)
    *H04W 4/80*     (2018.01)
    *H04B 7/15*     (2006.01)

(52) U.S. Cl.
    CPC .............. *H04W 88/04* (2013.01); *H04W 4/80* (2018.02); *H04W 84/18* (2013.01)

(56) References Cited

U.S. PATENT DOCUMENTS

| | | | |
|---|---|---|---|
| 2016/0112303 A1* | 4/2016 | Yoo | H04L 45/24 398/45 |
| 2016/0191642 A1* | 6/2016 | Acar | H04L 67/2814 455/41.2 |
| 2016/0278079 A1 | 9/2016 | Xhafa et al. | |
| 2016/0365952 A1* | 12/2016 | Kim | H04L 1/0083 |

OTHER PUBLICATIONS

Q. Deng, Exploiting diversity in Broadband Wireless Relay Networks, Aug. 2012, pp. 1-170.*

* cited by examiner

| BYTE | VALUE | DESCRIPTION |
|---|---|---|
| 0 | 0x03-0x1F | LENGTH OF DATA |
| 1 | 0xFF | MANUFACTURER-SPECIFIC DATA FLAG |
| 2 | 0x0D | COMPANY ID |
| 3 | 0x00 | EXAMPLE, 0x000D → TEXAS INSTRUMENTS |
| 4-31 | - | USER DEFINED DATA (OPTIONAL) |

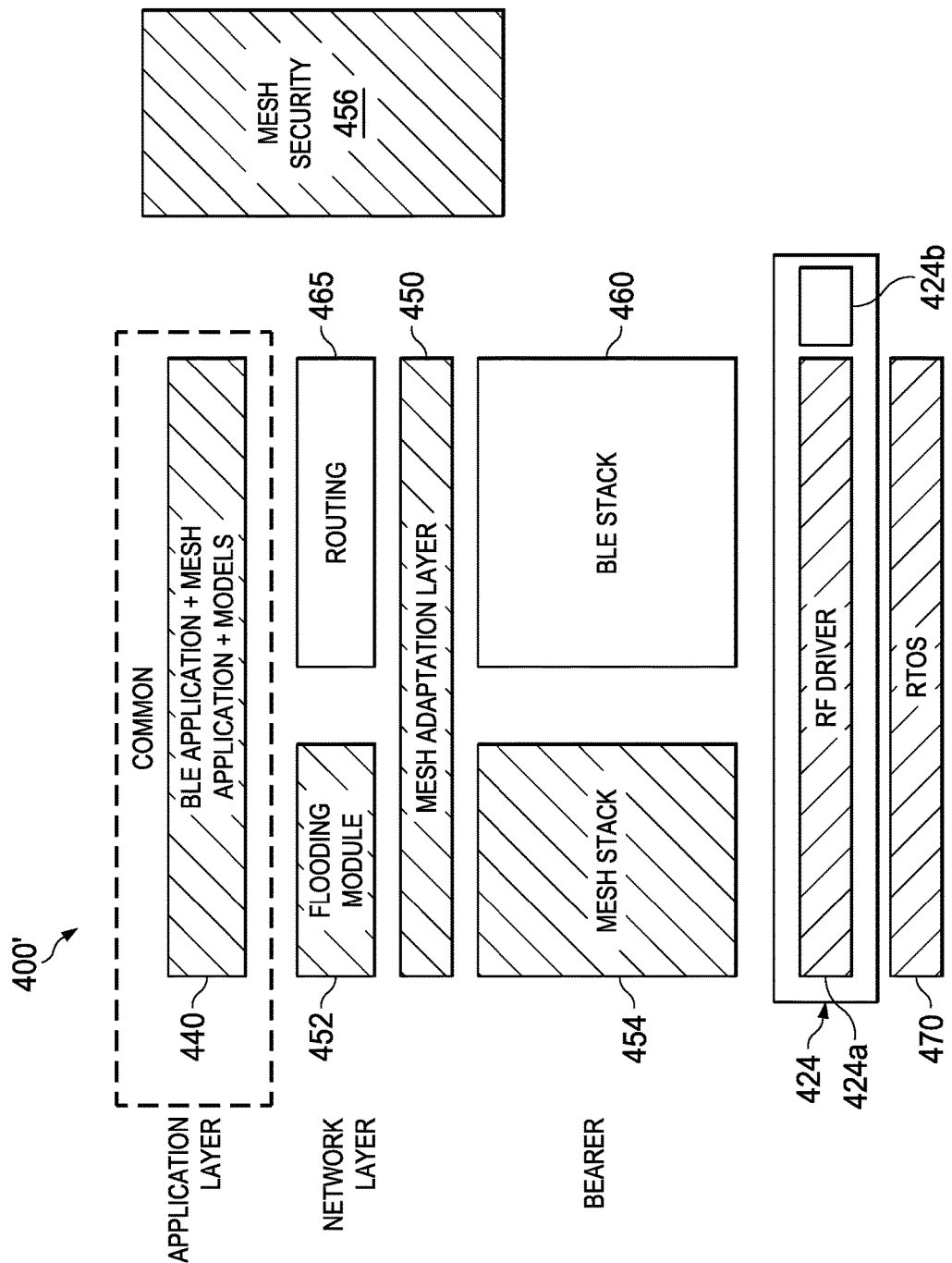

REDUNDANT TRAFFIC SUPPRESSION RELAYING MECHANISM FOR BLE-MESH SYSTEMS

CROSS REFERENCE TO RELATED APPLICATIONS

This application and the subject matter disclosed herein claims the benefit of Provisional Application Ser. No. 62/331,242 entitled "Enhanced relaying mechanism for BLE-Mesh Systems maintaining interoperability" filed May 3, 2016, which is herein incorporated by reference in its entirety.

FIELD

Disclosed embodiments relate generally to wireless communications, more specifically to Bluetooth Low Energy (BLE) automation mesh network (BLE-Mesh) communications.

BACKGROUND

BLE-Mesh is a wireless personal area network (WPAN) technology that uses a flooding-based protocol that with packet retransmission extends the range of BLE devices by including the ability to send messages to and amongst groups of devices. The devices in the BLE-Mesh network can support both BLE and BLE-mesh, but not necessarily both. A rebroadcasting mesh network works by flooding each message to all device nodes in the network through broadcasts.

The device nodes in the mesh network all share a set of indexed data slots. Each time a device receives a broadcast message from another device in the mesh, the device repeats the message (rebroadcasts it), enabling its neighboring devices to 'hear' the new message. This rebroadcast process is repeated until all devices in the mesh have received the same message. Flooding thus enables wireless devices to 'talk' to each other without being within a direct radio range, as devices between them help by relaying the messages. In a typical WPAN there are edge device(s) which are battery powered, relay devices that are always on as they are always in the listening mode, and there are functional end device(s) such as lights.

A BLE-Mesh specification can use time to live (TTL) and cache for flooding control. TTL limits the lifespan (or lifetime) of data in the mesh network by being implemented as a timestamp embedded in the data. Once a prescribed event count or the timespan has elapsed, the packet data is discarded so that when the TTL is zero there is no packet relaying.

Each packet contains the sender's unique source (SRC) address as well as a packet sequence (SEQ) number, and the payload can also be tagged with the type of message called a model. The packet specifies a unique address of each device in the mesh that can be derived from the device's Universally Unique Identifier (UUID). The SEQ number is a field indicating the sequence number of a message, which prevents device nodes from relaying packets that they have received before. For example, a single number bit may be used for the SEQ, where the SEQ number bit is initialized to 0 by the device upon entering the connection state, and where the SEQ number bit is changed (from 0 to 1, or vice versa if initialized to 1) for each new packet sent by the device, but is not changed when a packet is relayed (resent) by the device. Models are application implementations, such as a lighting model that defines the command to dim a light, or get status.

For packet addressing, besides a unique SRC address, the packet also contains the address to whom the packet is addressed. A network device that receives the packet checks if it is the intended receiver of the packet and then begins processing the information within. Devices that hear the packet but are not the intended receiver discard them, or send them back out as a broadcast. This relay function is possible, since a TTL counter is used. The packet will only be repeated so many times, and since packets that come around are being recognized as already received, they will not be repeated.

SUMMARY

This Summary is provided to introduce a brief selection of disclosed concepts in a simplified form that are further described below in the Detailed Description including the drawings provided. This Summary is not intended to limit the claimed subject matter's scope.

As described above BLE-Mesh uses a network flooding protocol. The network flooding protocol is recognized herein to undesirably generally result in a large number of redundant packets causing a high level of congestion and contention that occurs quickly in large scale mesh networks. Mesh standards do not provide any flooding (relaying) algorithm because the TTL conventionally used limits the lifespan (or lifetime) of data in the mesh network by being implemented as a timestamp embedded in the data, and once a prescribed event count or the timespan has elapsed, the data is discarded. Thus a flooding control algorithm is left up to the BLE-Mesh device manufacturer's implementation.

Disclosed embodiments provide redundant traffic suppression relaying mechanism for BLE-mesh systems that reduce packet collisions by intelligently suppressing redundant traffic to improve BLE-Mesh system scalability and latency. The suppression of redundant relay packets can optionally be adapted based on the number and types (whether a higher-speed capable device or a lower-speed device) of the neighboring device nodes.

One embodiment comprises a method of reducing packet collisions for a first relay device in a BLE-mesh communications network including a plurality of neighboring relay devices and at least one edge device. The method comprises providing a redundant traffic suppression relaying algorithm to the first device that implements the method, including waiting for a random time within a selected time window from a time W1 to a later time W2, where W2>W1, before attempting to transmit a first packet that has the first relay device's source (SRC) address and a sequence (SEQ) number. If during the random time a packet with both the first relay device's SRC address and the SEQ number for the first packet is received by the first relay device, a counter is incremented from an initial count to generate a current count. After the random time elapses, the current count is compared to a Cthreshold value, and the first packet is transmitted only if the current count<the Cthreshold value.

BRIEF DESCRIPTION OF THE DRAWINGS

Reference will now be made to the accompanying drawings, which are not necessarily drawn to scale, wherein:

FIG. 4B is a functional layer depiction of the BLE-Mesh device shown in FIG. 4A.

DETAILED DESCRIPTION

Figures 1, 2:
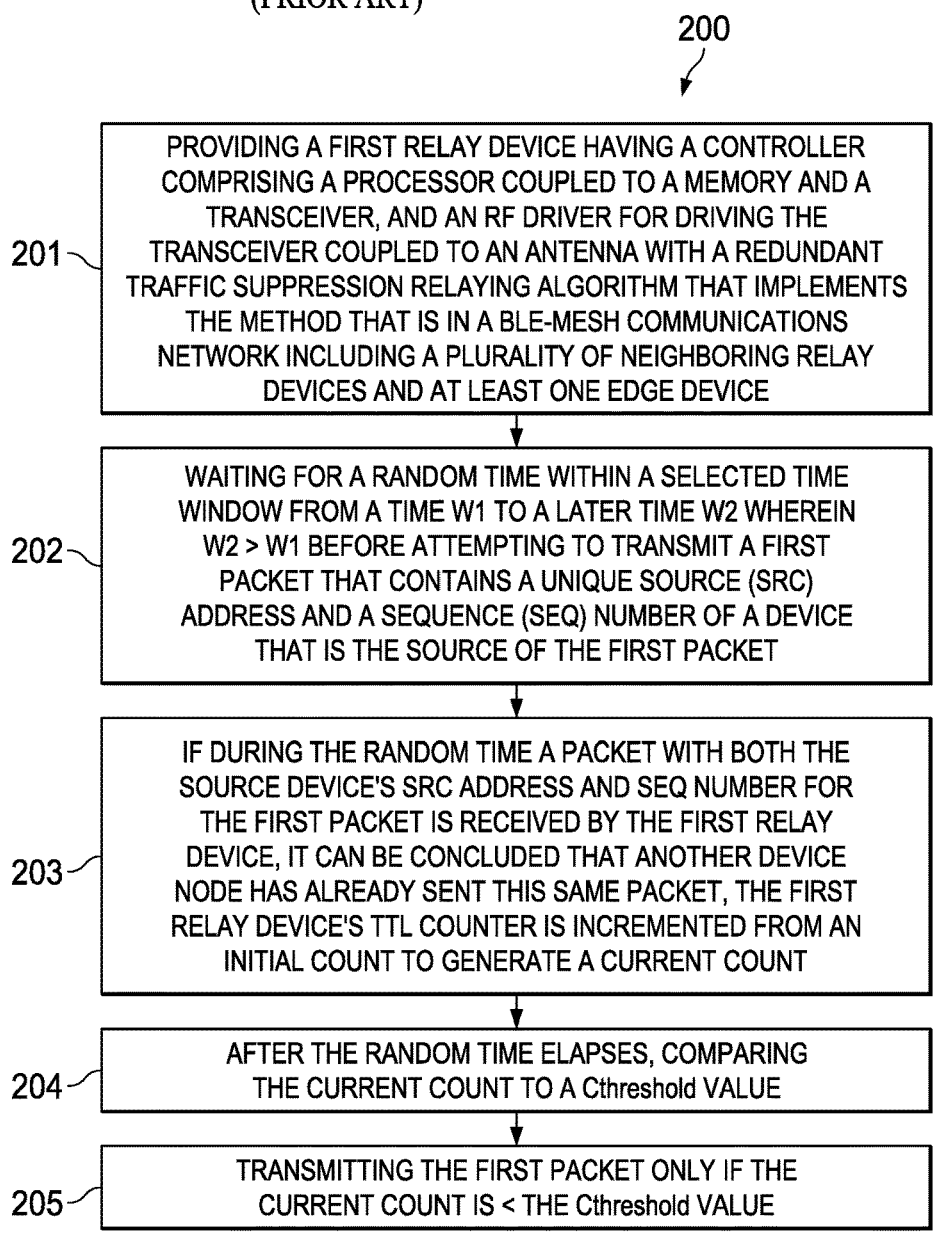
FIG. 1 shows a simplified BLE-mesh communications network including a plurality of neighboring relay devices and at least one edge device that is described implementing a disclosed method of redundant traffic suppression relaying for reducing packet collisions for relay devices, according to an example embodiment.
FIG. 2 is a flow chart which shows steps in an example method for reducing packet collisions for relay devices by suppressing redundant traffic, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows a simplified BLE-mesh communications network 100 including a plurality of neighboring relay devices (shown as device Nodes A, B and C) at least one edge device (shown as D), where relay device C is described implementing a disclosed method of suppressing redundant traffic for relay devices, according to an example embodiment. As shown, if device node C experiences a packet collision, device node C may not retransmit a message received from Node A or Node B, so that edge device node D may never receive a required message.

FIG. 2 is a flowchart for an example method 200 for reducing packet collisions for relay devices by suppressing redundant traffic. Step 201 comprises providing the first relay device having a controller comprising a processor coupled to a memory and to a transceiver, an RF driver for driving the transceiver, the transceiver coupled to an antenna, with a disclosed redundant traffic suppression relaying algorithm that implements the method which is in a BLE-mesh communications network including a plurality of neighboring relay devices and at least one edge device. Step 202 comprises waiting for a random time within a selected time window from a time W1 to a later time W2 wherein W2>W1 before attempting to transmit a first packet that contains a unique source (SRC) address and a packet sequence (SEQ) number of a device that is the source of the first packet.

Step 203 comprises if during the random time a packet with both the source device's SRC address and SEQ number (thus being the same packet as the first packet) is received by the first relay device, it can be concluded that another device node has already sent this same packet, the first relay device's TTL counter is incremented from an initial count to generate a current count. Step 204 comprises after the random time elapses, comparing the current count to a Cthreshold value. Step 205 comprises transmitting the first packet only if the current count is <the Cthreshold value.

The random time can generally be selected by any random number generator algorithm. In the programming context this will generally be implemented as rand( ) % 10, which will return a random number between 0 and 10. The time window (from W1 to W2) is set to an integral multiple of the time durations needed for clear channel assessment (CCA). Radio hardware at the first relay device will have a specific CCA time duration T_CCA, so that if W1=0, then W2 will be n times T_CCA, such that n>=1.

Disclosed embodiments include delaying or suppressing packets based on the current traffic. A beacon transmission is generally required for each device in the mesh every 10 sec or so, and beacons are not relayed across the network. If after the random time elapses but before the transmitting the current count is≥Cthreshold value, the method can further comprise updating a beacon payload if the beacon payload has changed, and incrementing W1 by x and W2 by y, wherein y>x. The purpose of this incrementing is to delay and increases the listening window, thereby increasing the probability of receiving packets with the same SRC address and SEQ number. Y is typically such that if x is incremented by amount K, then y>=x+K where x and K are non-zero. If the current count<the Cthreshold value, the method returns to waiting for the random time elapse.

Disclosed embodiments include using an adaptive Cthreshold value based on a number of neighboring relay devices as opposed to using a fixed Cthreshold value. For static networks the number of neighboring relay devices is constant, but for mobile networks the number of neighboring relay devices can change over time. The higher the number of neighboring relay devices the higher the Cthreshold value used and vice versa. The method can thus further comprise dynamically determining a number of neighboring relay devices, and adaptively changing the Cthreshold value based on this number so that the Cthreshold value increases for a higher number of neighboring relay devices and decreases for a lower number of neighboring relay devices.

Figures 3A, 3B:
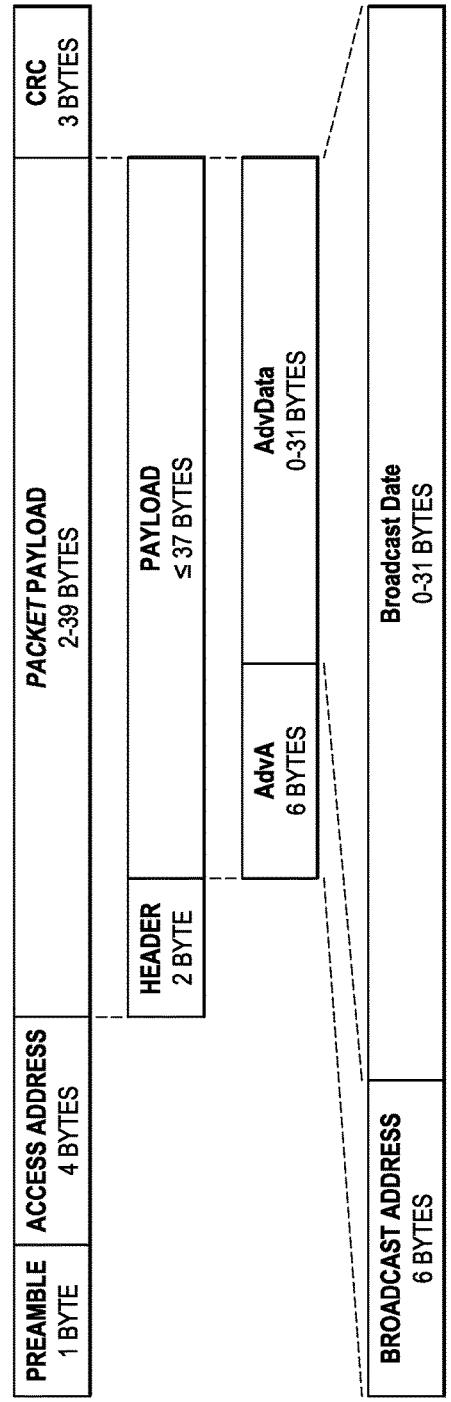
FIG. 3A shows an example ping model that disclosed embodiments can implement for determining a number of neighboring relays.
FIG. 3B shows the various fields in an example mesh packet.

The dynamically determining the number of neighboring relay devices can comprise transmitting a broadcast ping and using received pong responses that are responsive to the pings from the neighboring relay devices to determine this number. FIG. 3A shows an example ping packet that disclosed embodiments can implement for determining a number of neighboring relay devices. An example ping field and the pong field are shown. The method can comprise using received pong responses responsive to the ping to determine the number of neighboring relay devices comprising setting an initial TTL value to 1 for the ping which allows the packet to be sent to only immediate neighbors, and not to neighbors beyond the first hop.

FIG. 3B shows the various fields in a mesh packet. In the packet payload field there can be seen to be a device address shown as a 6 byte broadcast address which includes the device manufacturer's ID (shown as the Company ID in FIG. 3C described below) of the BLE-Mesh device that is used to determine whether each of the neighborhood BLE-Mesh relay devices is a high-speed device or is not a high-speed device. For public device addresses there is currently a 48-bit address obtained from Institute of Electrical and Electronics Engineers (IEEE) Registration authority, where bits 0-23 are Company assigned, and bits 24-47 have the Company's ID which can be used to determine the manufacturer of the BLE-Mesh device.

The device address range obtained from the pong can thus be used by the relay device to determine which of neighboring relay devices are high performance neighboring devices, and for maintaining a neighbor list with high performance devices and non-high performance device identified (or marked). A higher-speed data rate can be utilized by the relay device for mesh communications if a percentage of higher-speed capable devices is ≥a threshold percentage or a lower-speed data rate can be utilized for the mesh communications if the percentage of higher-speed capable devices is <the threshold percentage. For one example, the threshold percentage can be 50%.

Disclosed embodiments also include beacon rate adaptation so that if beacon packet has changed, it is sent it out quickly, and if the beacon packet is stale, then it is dropped. The beacon packet is different from a data packet. The method can comprise if a beacon payload changes between most recent beacon packets received by the first relay device, decrementing a beacon rate in a first beacon packet to be transmitted by said first relay device if W1≠a W1min value and W2≠a W2 min value. W1min and W2 min value are values set similar to how the time window is set based on CCA as described above.

The first packet is queued as the first beacon packet and there is a wait for the random time in the selected time window before the transmitting. If the same source device's SRC address and SEQ numbers are received in the most recent received data packet (SEQprev) or a beacon packet is heard then the counter is incremented, else if the SEQ number>SEQprev, and said SRC address is the same, then the first beacon packet is dropped and the method goes to the queuing. If the current count≥the Cthreshold value, then the beacon payload is updated if changed and the method returns to the queuing, and if W1≠W1max and W2≠W2max, W1 is incremented by x and W2 by y and the first data packet is dropped. If the current count<the Cthreshold value the first beacon packet is transmitted and the method returns to queuing the first packet after transmitting said beacon packet.

Figures 3C, 4A:
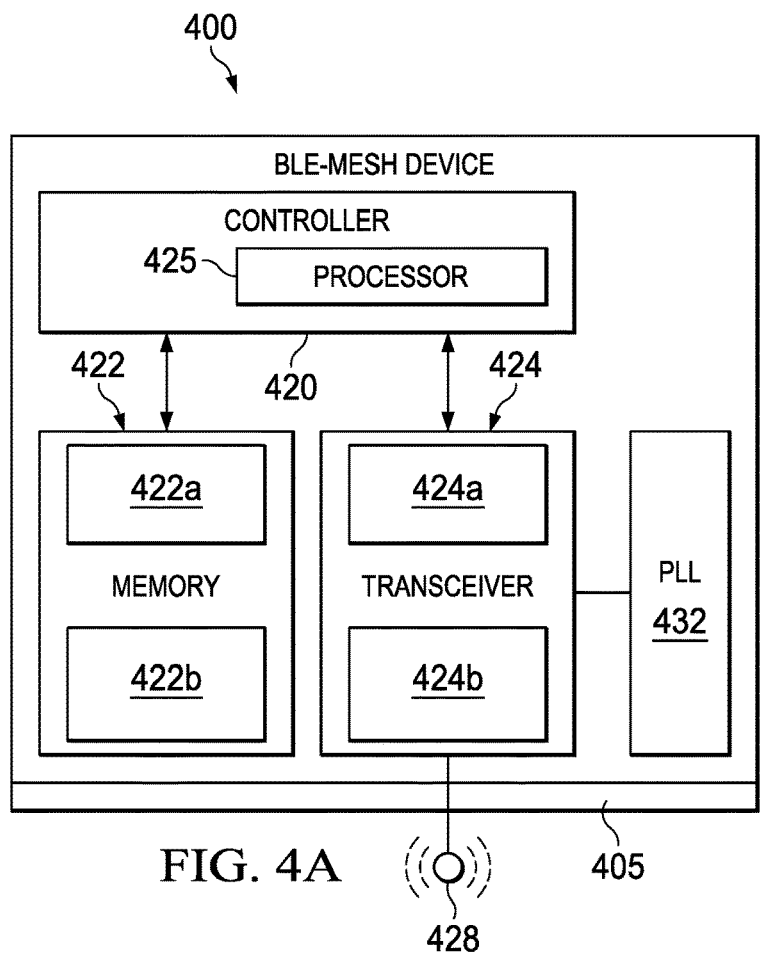
FIG. 3C shows an example proprietary packet that includes a manufacturer specific data type in broadcast data.
FIG. 4A is a block diagram schematic of an example disclosed BLE-Mesh device that has a disclosed redundant traffic suppression relaying algorithm for BLE-Mesh communications, according to an example embodiment.

FIG. 3C shows an example proprietary packet that includes a manufacturer specific data type 0XFF in broadcast data. The manufacturer specific data type 0XFF in the broadcast data field of the packet can be used to determine whether the device is a high-speed capable device (e.g., supporting a maximum data rate of 2 MB/sec) or a regular speed/slow (e.g., supporting a maximum data rate of 1 MB/sec). The neighbor list can be used by the relay device for performing higher speed messaging between high performance devices as compared to a speed of messaging involving non-high performance devices. The method can further comprise the high performance devices sending manufacturer specific data in the first packet to indicate the neighbor list, asking for beacons in the first packet, or asking for lesser suppression from neighboring ones of the high performance devices.

FIG. 4A shows a system block diagram representation for an example BLE-Mesh device 400 that generally conforms to the BLE communications standard which includes a disclosed redundant traffic suppression relaying algorithm. The BLE-Mesh device 400 is generally formed on an integrated circuit (IC) shown formed on a substrate 405 having a semiconductor surface. The BLE-Mesh device 400 may be any device that can engage in BLE communications. Such devices may be, may include, or may be a part of, mobile phones such as smartphone, tablets, computers, personal digital assistants, and household items with communication capabilities such as door knobs, window blinds, and motion sensors. The BLE-Mesh device 400 communicates in a BLE-mesh network along with as plurality of other BLE devices to a network (e.g., the Internet) that is coupled to a central authority database that is generally stored on a server.

The BLE-Mesh device 400 comprises a controller 420 including a processor 425, a memory 422 including software 422a for a disclosed redundant traffic suppression relaying algorithm to implement a disclosed method for reducing packet collisions for relay devices by suppressing redundant traffic, and a transceiver 424 including an RF driver 424a that is coupled to an antenna 428. The processor 425 can comprise a digital signal processor (DSP) or microcontroller. The controller 420 implements as shown in FIG. 4B a BLE stack 460 for BLE operations and a mesh stack 454 for mesh operations.

The transceiver 424 is also shown including hardware comprising digital logic 424b that can be used as an alternative to software 422a for implementing a disclosed redundant traffic suppression relaying algorithm. As known in the art the transceiver 424 includes a transmitter and a receiver. The transmitter generally comprises a media access control (MAC) module, an encoder, a modulator, an Inverse Fast Fourier Transform (IFFT) unit, a digital to analog conversion (DAC)/filter module, and an RF/antenna module. The receiver generally comprises an RF/antenna unit, an analog to digital conversion (ADC)/filter unit, a FFT unit, a demodulator, a decoder, and a MAC module. The counter for the BLE-Mesh device 400 may comprise hardware and/or software configured to maintain and increment a count value. It may, for example comprise a number of flip-flops, or it may be as shown implemented by firmware running on the processor 425 (e.g., a microcontroller), such the counter 422b shown in memory 422.

The memory 422 is more generally configured to store information including data, instructions, or both. The memory 422 may be any storage medium accessible by the controller 420, such as a read only memory (ROM), a random access memory (RAM), a register, cache memory, or magnetic media device such as internal hard disks and removable disks. A phase lock loop (PLL) 432 is also provided for purposes including mixing and frequency synthesis.

The controller 420 is coupled to the memory 422 and to the transceiver 424. In some implementations, the transceiver 424 comprises baseband units (not shown) and analog units (not shown) to transmit and receive RF signals. The baseband unit may comprise hardware to perform baseband signal processing including digital signal processing, coding and decoding, modulation, and demodulation. The analog unit may comprise hardware to perform ADC, DAC, filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission.

The analog unit comprises a mixer to up-convert the baseband signals and down-convert the RF signals with a carrier signal oscillated at the radio frequencies of the BLE-mesh network. For the mesh communications the radio frequencies depend on the radio access technology and in one embodiment may in the 2.4 GHz to 2.483-GHz frequency band. In the above-described embodiments using a higher-speed data rate is utilized by the relay device for communications if a percentage of higher-speed capable devices is ≥a threshold percentage or a lower-speed data rate utilized for the communications if the percentage of higher-speed capable devices is <the threshold percentage, the higher-speed data rate may be in the 2.4 GHz to 2.483-GHz frequency band and the lower-speed data rate may be in lower frequency band, such as a band in the range 1.0 to 1.5 GHz.

FIG. 4B is a functional layer depiction of the BLE-Mesh device 400 shown in FIG. 4A now shown as 400' that includes an application layer including BLE applications, mesh application, and models 440. All blocks above the RF driver 424a are generally software (SW) running on the processor 425 shown in FIG. 4A in memory 422 (typically stored in flash RAM or ROM). BLE-Mesh device 400' implements simultaneous operation of the BLE and Mesh software (SW) stacks using the RF driver 424a.

The Mesh adaptation layer 450 formats for BLE or Mesh accordingly and signals appropriate for the particular application. The RF driver 424a includes driver Application Programming Interface (API) software and the radio itself in hardware. There is also a flooding module 452, and the Mesh stack 454 providing mesh security all for mesh communications. There is also a routing block 465 that is different from the flooding module-based mesh. If routing is present, then routing block 465 at each node maintains neighbor tables and messages that are sent via deterministic paths to reach a specific destination. In a flooding-based mesh controlled by flooding module, messages are broadcast to all devices across the network over multiple hops.

BLE-Mesh device 400' also includes BLE stack 460. BLE stack 460 controls connections and advertising in Bluetooth, and describes how data is exchanged from two connected devices for BLE. BLE-Mesh device 400' is also shown having a real-time operating system (RTOS) 470. RTOS 470 scales from a low-footprint, real-time preemptive multi-tasking kernel to a complete RTOS with additional middleware components including a power manager, and device drivers.

Regarding detectability of disclosed redundant traffic suppression, one can use a packet sniffer to detect manufacturer specific transmissions. A device node can be used to relay packets and observe if the BLE-mesh device under test suppresses or delays transmissions using a packet sniffer. A non-disclosed conventional BLE-mesh device should transmit the received packet at least once. If disclosed redundant traffic suppression is being used by the BLE-mesh device under test the packet may never get transmitted, and beacons may get delayed by more than 10 to 20 seconds.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of reducing packet collisions for a first relay device in a BLE-mesh communications network including a plurality of neighboring relay devices and at least one edge device, comprising:
   providing said first relay device having a controller comprising a processor coupled to a memory and to a transceiver, an RF driver for driving said transceiver, said transceiver coupled to an antenna, and a redundant traffic suppression relaying algorithm that implements said method, said method including:
      waiting for a random time within a selected time window from a time W1 to a later time W2 wherein said W2>said W1 before attempting to transmit a first packet that contains a unique source (SRC) address and a packet sequence (SEQ) number of a device that is the source of the first packet;
      if during said random time a packet with both said source device's SRC address and said SEQ number is received by said first relay device, incrementing a counter from an initial count to generate a current count;
      after said random time elapses, comparing said current count to a Cthreshold value; and
      transmitting said first packet only if said current count<said Cthreshold value.

2. The method of claim 1, wherein said redundant traffic suppression relaying algorithm comprises software stored in said memory that is implemented by said processor.

3. A method of reducing packet collisions for a first relay device in a BLE-mesh communications network including a plurality of neighboring relay devices and at least one edge device, comprising:
   providing said first relay device having a controller comprising a processor coupled to a memory and to a transceiver, an RF driver for driving said transceiver, said transceiver coupled to an antenna, and a redundant traffic suppression relaying algorithm that implements said method, said method including:
      waiting for a random time within a selected time window from a time W1 to a later time W2 wherein said W2>said W1 before attempting to transmit a first packet that contains a unique source (SRC) address and a packet sequence (SEQ) number of a device that is the source of the first packet;
      if during said random time a packet with both said source device's SRC address and said SEQ number is received by said first relay device, incrementing a counter from an initial count to generate a current count;
      after said random time elapses, comparing said current count to a Cthreshold value; and
      transmitting said first packet only if said current count<said Cthreshold value; wherein if after said random time elapses but before said transmitting said current count is greater than or equal to (≥) said Cthreshold value, further comprising:
         updating a beacon payload if said beacon payload has changed;
         incrementing said W1 by x and said W2 by y, wherein said y>said x; and
         wherein if said current count<said Cthreshold value, returning to said waiting for said random time.

4. A method of reducing packet collisions for a first relay device in a BLE-mesh communications network including a plurality of neighboring relay devices and at least one edge device, comprising:

providing said first relay device having a controller comprising a processor coupled to a memory and to a transceiver, an RF driver for driving said transceiver, said transceiver coupled to an antenna, and a redundant traffic suppression relaying algorithm that implements said method, said method including;
  waiting for a random time within a selected time window from a time W1 to a later time W2 wherein said W2>said W1 before attempting to transmit a first packet that contains a unique source (SRC) address and a packet sequence (SEQ) number of a device that is the source of the first packet;
  if during said random time a packet with both said source device's SRC address and said SEQ number is received by said first relay device, incrementing a counter from an initial count to generate a current count;
  after said random time elapses, comparing said current count to a Cthreshold value;
  transmitting said first packet only if said current count<said Cthreshold value;
  dynamically determining a number of said plurality of neighboring relay devices; and
  adaptively changing said Cthreshold value based on said number so that said Cthreshold value increases for a higher number of said neighboring relay devices and said Cthreshold value decreases for a lower number of said neighboring relay devices.

5. The method of claim 4, wherein said dynamically determining said number of said neighboring relay devices comprises transmitting a ping and using received pong responses that are responsive to said ping from said neighboring relay devices to determine said number of said neighboring relay devices.

6. The method of claim 5, wherein said using received pong responses responsive to said ping to determine said number of said neighboring relay devices comprises:
  setting an initial time to live (TTL) value to 1 for said ping;
  using a device address range obtained from said pongs to determine which of said number of said neighboring relay devices are higher-speed capable devices, and
  maintaining a neighbor list with said higher-speed capable devices and lower-speed device identified.

7. The method of claim 6, further comprising:
  using said neighbor list to determine if a percentage of said higher-speed capable devices is greater than or equal to (≥) a threshold percentage;
  utilizing a higher-speed data rate for mesh communications in said BLE-mesh communications network if a percentage of said higher-speed capable devices is greater than or equal to (≥) said threshold percentage; and
  utilizing a lower-speed data rate for communications in said BLE-mesh communications network if said percentage of said higher-speed capable devices is less than (<) said threshold percentage.

8. The method of claim 7, further comprising one of said higher-speed capable devices sending manufacturer specific data in said first packet to indicate said neighbor list, asking for beacons in said first packet, or asking for lesser suppression from neighboring ones of said higher-speed capable devices in said first packet.

9. The method of claim 5,
  wherein if a beacon payload changes between most recent beacon packets received by the first relay device, decrementing a beacon rate in a first beacon packet to be transmitted by said first relay device if said W1≠a W1min value and said W2≠a W2 min value;
  queuing said first packet as said first beacon packet and waiting for said random time in said selected time window before said transmitting;
  if said packet is received with said source device's SRC address and said SEQ number or a beacon packet is heard then increment said counter;
  else if said packet is received with a SEQ number>said SEQ number and said source device's SRC address is also present, then drop said first beacon packet and go to said queuing;
  wherein if said current count>=said Cthreshold value, then updating said beacon payload if changed and go to said queuing;
  wherein if said W1≠W1max and said W2≠W2max, incrementing W1 by x and W2 by y and dropping said first packet; and
  if said current count<said Cthreshold value, then return to said queuing said first packet after transmitting said beacon packet.

10. A BLE-Mesh device, comprising:
  a controller comprising a processor coupled to a memory and to a transceiver, an RF driver for driving said transceiver, said transceiver adapted to be coupled to an antenna, said controller implementing an applications layer including BLE applications and Mesh Applications, and a BLE stack for BLE operations and a mesh stack for mesh operation, and a counter,
  a redundant traffic suppression relaying algorithm that comprises software stored in said memory that is implemented by said processor or is implemented by hardware including digital logic, said algorithm:
    waiting for a random time within a selected time window from a time W1 to a later time W2 wherein said W2>said W1 before attempting to transmit a first packet that has a unique source (SRC) address of a device that is the source of the first packet and a sequence (SEQ) number;
    if during said random time a packet with both said SRC address for said source device and said SEQ number is received by said first relay device, incrementing said counter from an initial count to generate a current count;
    after said random time elapses, comparing said current count to a Cthreshold value; and
    transmitting said first packet only if said current count<said Cthreshold value.

11. The BLE-Mesh device of claim 10, wherein said redundant traffic suppression relaying algorithm comprises said software stored in said memory that is implemented by said processor.

12. The BLE-Mesh device of claim 10, wherein said redundant traffic suppression relaying algorithm comprises hardware including said digital logic.

13. The BLE-Mesh device of claim 10, wherein said BLE-Mesh device is formed on an integrated circuit (IC) comprising a substrate having a semiconductor surface, wherein said processor comprises a digital signal processor (DSP) or a microcontroller.

14. A BLE-Mesh device, comprising:
  a controller comprising a processor coupled to a memory and to a transceiver, an RF driver for driving said transceiver, said transceiver adapted to be coupled to an antenna, said controller implementing an applications layer including BLE applications and Mesh Applications, and a BLE stack for BLE operations and a mesh stack for mesh operation, and a counter;

a redundant traffic suppression relaying algorithm that comprises software stored in said memory that is implemented by said processor or is implemented by hardware including digital logic, said algorithm:

waiting for a random time within a selected time window from a time W1 to a later time W2 wherein said W2>said W1 before attempting to transmit a first packet that has a unique source (SRC) address of a device that is the source of the first packet and a sequence (SEQ) number;

if during said random time a packet with both said SRC address for said source device and said SEQ number is received by said first relay device, incrementing said counter from an initial count to generate a current count;

after said random time elapses, comparing said current count to a Cthreshold value; and transmitting said first packet only if said current count<said Cthreshold value, wherein, if after said random time elapses but before said transmitting said current count is greater than or equal to (≥) said Cthreshold value, said redundant traffic suppression relaying algorithm further comprising:

updating a beacon payload if said beacon payload has changed;

incrementing said W1 by x and said W2 by y, wherein said y>said x; and wherein if said current count<said Cthreshold value, returning to said waiting for said random time.

15. A BLE-Mesh device, comprising:

a controller comprising a processor coupled to a memory and to a transceiver, an RF driver for driving said transceiver, said transceiver adapted to be coupled to an antenna, said controller implementing an applications layer including BLE applications and Mesh Applications, and a BLE stack for BLE operations and a mesh stack for mesh operation, and a counter;

a redundant traffic suppression relaying algorithm that comprises software stored in said memory that is implemented by said processor or is implemented by hardware including digital logic, said algorithm:

dynamically determining a number of said plurality of neighboring relay devices;

adaptively changing said Cthreshold value based on said number so that said Cthreshold value increases for a higher number of neighboring relay devices and said Cthreshold value decreases for a lower number of said neighboring relay devices;

waiting for a random time within a selected time window from a time W1 to a later time W2 wherein said W2>said W1 before attempting to transmit a first packet that has a unique source (SRC) address of a device that is the source of the first packet and a sequence (SEQ) number;

if during said random time a packet with both said SRC address for said source device and said SEQ number is received by said first relay device, incrementing said counter from an initial count to generate a current count;

after said random time elapses, comparing said current count to a Cthreshold value; and transmitting said first packet only if said current count<said Cthreshold value.

16. The BLE-Mesh device of claim 15, wherein said dynamically determining said number of said neighboring relay devices comprises transmitting a ping and using received pong responses that are responsive to said ping from said plurality of neighboring relay devices to determine said number of said neighboring relay devices.

17. The BLE-Mesh device of claim 16, wherein said using received pong responses responsive to said ping to determine said number of said neighboring relay devices comprises:

setting an initial time to live (TTL) value to 1 for said ping;

using a device address range obtained from said pongs to determine which of said number of said neighboring relay devices are higher-speed capable devices;

maintaining a neighbor list with said higher-speed capable devices and lower-speed device identified;

using said neighbor list to determine if a percentage of said higher-speed capable devices is greater than or equal to (≥) a threshold percentage;

utilizing a higher-speed data rate for mesh communications if a percentage of said higher-speed capable devices is greater than or equal to (≥) said threshold percentage; and utilizing a lower-speed data rate for communications in said BLE-mesh network if said percentage of said higher-speed capable devices is less than (<) said threshold percentage.

18. The BLE-Mesh device of claim 17, said redundant traffic suppression relaying algorithm further comprising using said neighbor list to determine if a percentage of said higher-speed capable devices is greater than or equal to (≥) said threshold percentage;

utilizing a higher-speed data rate for mesh communications in said BLE-mesh network if a percentage of said higher-speed capable devices is greater than or equal to (≥) said threshold percentage; and utilizing a lower-speed data rate for communications in said BLE-mesh network if said percentage of said higher-speed capable devices is less than (<) said threshold percentage.

19. The BLE-Mesh device of claim 16, said redundant traffic suppression relaying algorithm further comprising wherein if a beacon payload changes between most recent beacon packets received by the first relay device, decrementing a beacon rate in a first beacon packet to be transmitted by said first relay device if said W1≠a W1min value and said W2≠a W2 min value;

queuing said first packet as said first beacon packet and waiting for said random time in said selected time window before said transmitting;

if said packet is received with said source device's SRC address and said SEQ number or a beacon packet is heard then increment said counter;

else if said packet is received with a SEQ number>said SEQ number and said source device's SRC address is also present, then drop said first beacon packet and go to said queuing;

wherein if said current count>=said Cthreshold value, updating said beacon payload if changed and go to said queuing;

wherein if said W1≠W1max and said W2≠W2max, incrementing W1 by x and W2 by y and dropping said first packet; and if said current count<said Cthreshold value, returning to said queuing said first packet after transmitting said beacon packet.

20. A method of reducing packet collisions for a first relay device in a BLE-mesh communications network including a plurality of neighboring relay devices and at least one edge device, comprising:

providing said first relay device having a controller comprising a processor coupled to a memory and to a transceiver, an RF driver for driving said transceiver, said transceiver coupled to an antenna, and a redundant traffic suppression relaying algorithm that implements said method, said method including:

receiving a data packet that contains a unique source (SRC) address of a device that is the source of the data packet as well as a packet sequence (SEQ) number;

waiting for a random time within a selected time window from a time W1 to a later time W2 wherein said W2>said W1 before attempting to transmit the data packet;

if during said random time a packet with both said source device's SRC address and said SEQ number is received by said first relay device, incrementing a counter from an initial count to generate a current count;

after said random time elapses, comparing said current count to a Cthreshold value, and transmitting said first packet only if said current count<said Cthreshold value.

21. A method, comprising:

wailing for a random time within a selected time window from a time W1 to a later time W2 wherein said W2>said W1 before attempting to transmit a previously received data packet that contains a unique source (SRC) address and a packet sequence (SEQ) number of a device that is the source of the data packet;

if during said random time a packet with both said source device's SRC address and said SEQ number is received, incrementing a counter from an initial count to generate a current count;

after said random time elapses, comparing said current count to a Cthresbold value; and transmitting said first packet only if said current count<said Cthreshold value.

\* \* \* \* \*